(No Model.)

G. M. KERNODLE.
NUT LOCK.

No. 352,545.            Patented Nov. 16, 1886.

Witnesses
R. W. Bishop
Susie R. Seiler

Inventor
George M. Kernodle
By his Attorneys,
R. S. & A. P. Lacey

UNITED STATES PATENT OFFICE.

GEORGE MILTON KERNODLE, OF CARTERSVILLE, GEORGIA.

NUT-LOCK.

SPECIFICATION forming part of Letters Patent No. 352,545, dated November 16, 1886.

Application filed December 19, 1885. Serial No. 186,206. (No model.)

*To all whom it may concern:*

Be it known that I, GEORGE MILTON KERNODLE, a citizen of the United States, residing at Cartersville, in the county of Bartow and State of Georgia, have invented certain new and useful Improvements in Nut-Locks; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to nut locks, and in common with such devices it has for its object to securely fasten a bolt or nut in place when once screwed home, and prevent their accidental displacement when used on objects subject to vibratory motion. The nut and bolt lock is particularly applicable for bolting timbers, and is therefore best adapted for the construction of bridges, trestle-work, and such like structures.

It consists in a washer having a recess on its outer or front side for the reception of a nut, and having one or more teeth on its rear face, said teeth being formed on the arc of a circle.

It also consists in making said washer of cast, wrought, or any other metal, and providing it with a diametric groove or indentation.

It further consists in details of construction and combinations of parts, as shown, and particularly described hereinafter, and claimed.

Figure 1:
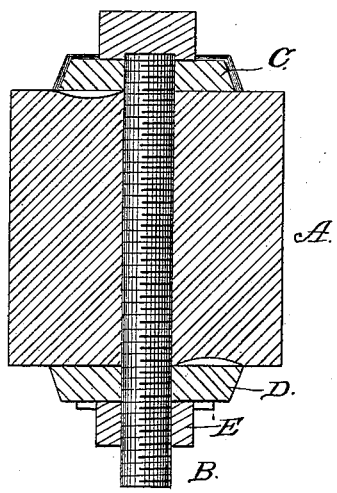
Figure 2:
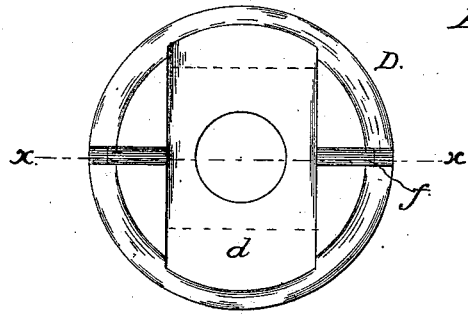
Figure 3:
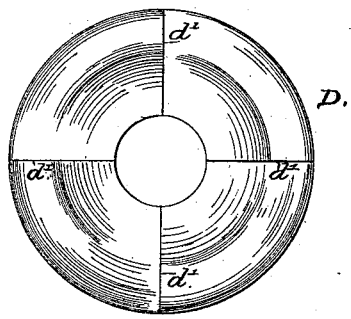
Figure 4:
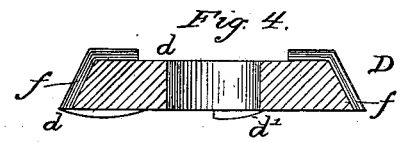
Figure 5:
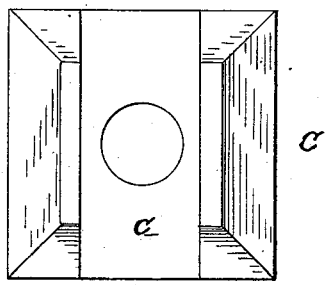

In the accompanying drawings, Figure 1 is a sectional view of a timber provided with my improvement. Fig. 2 is a plan view of the washer. Fig. 3 is a rear plan view of the same. Fig. 4 is a section on the line X X of Fig. 2. Fig. 5 is a plan view of the bolt-locking washer.

The timber A is transversely bored and a bolt, B, passed therethrough. Washers C and D are sleeved on the bolt on each end, all being confined by the nut E. The washer D on its front side has a recess, $d$, of suitable shape, to receive a nut which, when seated in the recess, will prevent either the washer or nut having a movement independent of the other. This recess, as shown, is oblong, and extends across the washer. The rear side of the washer has a series of teeth, $d'$, which are formed on the arc of a circle, the greatest depth of tooth being midway the outer and inner walls of the washer, as more clearly shown in Fig. 4. Each tooth has a gradual rearward slope, preserving the arc-shaped contour. As this washer is designed to be used only with timbers, the advantage of this form of tooth is manifest. For instance, in operation the washer is so placed that the nut seated in its recess will cause the washer to turn simultaneously with it. The sloping portion of each tooth advancing compresses the fibers of the wood, and by reason of the arc-shaped tooth the fibers are compressed to the right and left, thus allowing the highest portion of the tooth to be firmly embedded. Owing to the elasticity of such fibers they will spring up behind the teeth and prevent their backward motion. Thus it will be seen that the washer and nut are securely locked in place. When it is desired to remove a bolt thus locked, it has been found expedient to cut the washer, for which reason it is made of cast metal, and has a diametric groove or indentation, $f$, formed therein. A cold-chisel inserted in such groove and struck a smart blow will cause the division of the washer, the crystalline structure of which facilitates this operation.

To prevent the unscrewing of the bolt, the washer C has a recess, $c$, formed therein similar to that in the washer D. The head of the bolt is seated in this recess, and the bolt prevented rotating independent of the washer. The rear face of this washer is simply roughened, which is done by casting, or it may have any suitable projections to become embedded in the timber, and thus prevent its movement.

From the foregoing the operation of the several parts is obvious. A detailed description is therefore deemed unnecessary.

Having thus described my invention, what I claim, and desire to secure by Letters Patent, is—

1. A nut-lock washer having a recess on its upper side to receive the nut and a series of circumferential locking projections on its under side formed on the arc of a circle in their radial widths and tapered or sloped rearwardly in their circumferential length, whereby they will slide upon the surface of the beam or bar and become embedded therein when the said washer is turned, substantially as described.

2. A lock-nut washer provided with a recess in its front side to receive the nut, a series of projections on its rear side sloping rearwardly to form locking-teeth, a pair of which is located on diametric opposite sides of the washer at right angles to the nut-receiving recess, and a groove formed at right angles to the recess and in line with the termini of the locking-teeth, to facilitate the separation of the washer, substantially as hereinbefore set forth.

In testimony whereof I affix my signature in presence of two witnesses.

GEORGE MILTON KERNODLE.

Witnesses:
B. BARTLETT,
J. A. HOWARD.